2,705,894

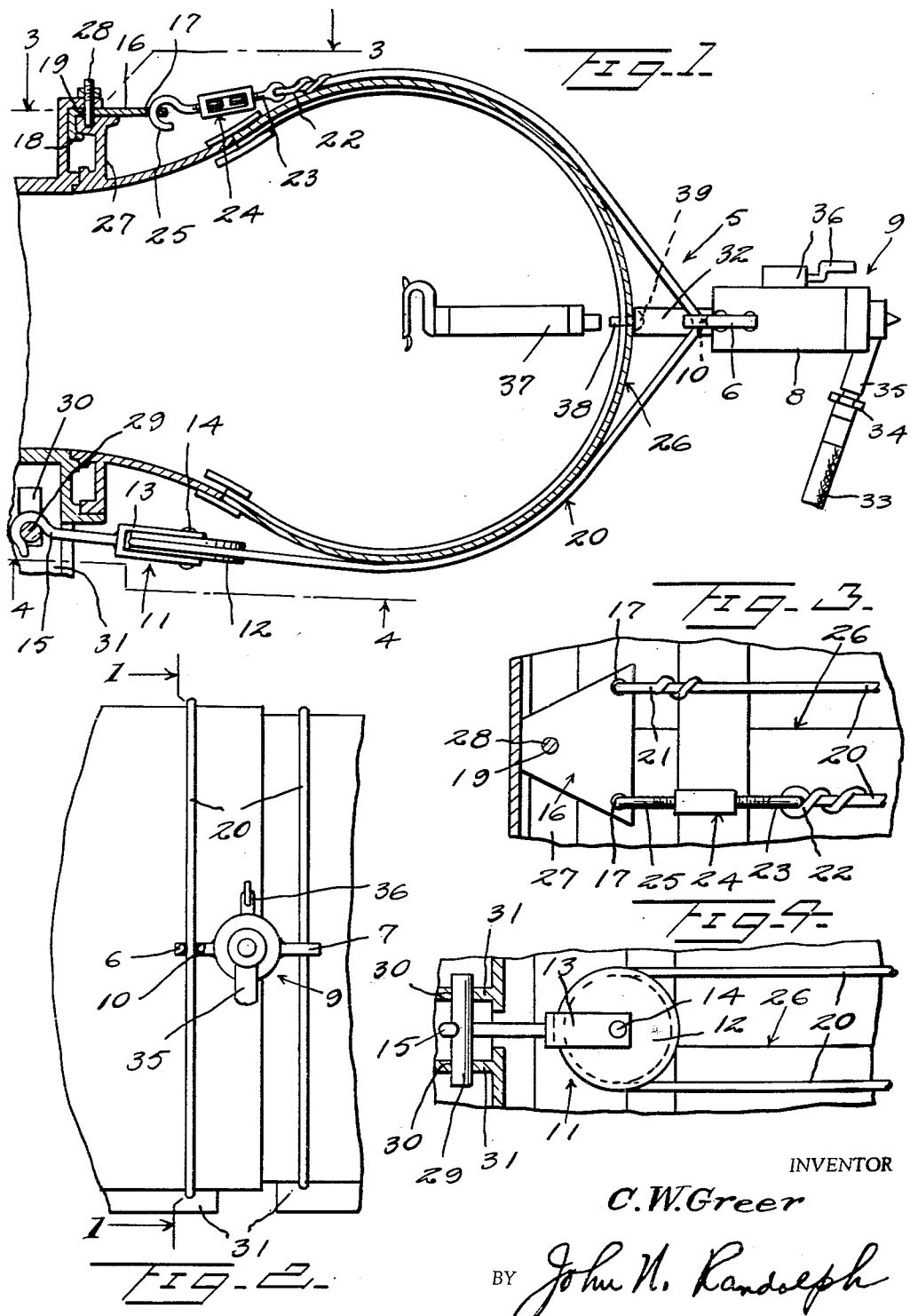

ATTACHMENT FOR HAMMER HOLDER-ON

Clifford W. Greer, Polson, Mont.

Application February 19, 1954, Serial No. 411,391

6 Claims. (Cl. 78—53.5)

This invention relates to an attachment for use with a conventional hammer holder-on and provides a harness for retaining the holder-on properly positioned for engaging the heads of rivets of a joint or seam while the other end of the rivet is upset and headed by any suitable tool conventionally employed for such a purpose.

More particularly, it is an aim of the present invention to provide an attachment forming a harness for supporting a hammer holder-on for engaging rivets of a partial girth joint and by means of which the hammer holder-on may slide relatively to the harness, when the plunger thereof is in a retracted position, for rapid movement of the holder-on relatively to the partial girth joint from one rivet to another.

Various other objects and advantages of the invention will hereinafter become more fully apparent from the following description of the drawing, illustrating a presently preferred embodiment thereof, and wherein:

Figure 1 is a side elevational view showing the attachment in an applied position and showing a partial girth joint in cross section, taken substantially along a plane as indicated by the line 1—1 of Figure 2;

Figure 2 is an end elevational view looking from right to left of Figure 1;

Figure 3 is an enlarged sectional view, partly in elevation, taken substantially along a plane as indicated by the line 3—3 of Figure 1, and Figure 4 is a similar view taken substantially along a plane as indicated by the line 4—4 of Figure 1.

Referring more specifically to the drawing, the holder-on attachment in its entirety and comprising the invention is designated generally 5 and in its preferred form as illustrated includes a pair of flanges or plates 6 and 7 which are secured in any suitable manner to a cylinder 8 of a conventional hammer holder-on 9. The plates or flanges 6 and 7 project outwardly from opposite sides of the cylinder 8 and extend beyond the forward end of said cylinder and are each provided in its outer portion with an opening 10. Thus, the plates 6 and 7 combine to form a yoke which is anchored to the cylinder 8.

As best seen in Figures 1 and 4, the attachment 5 also includes a pulley, designated generally 11, including a small grooved wheel 12 journalled in a frame 13 on a pin or axle 14. The pulley 11 also includes a hook 15 the shank of which is preferably swivelly connected to the intermediate portion of the frame 13.

The attachment 5 also includes an anchor plate 16 of generally triangular shape having openings 17 adjacent two of the corners thereof. The other corner of the plate 16 is preferably bent to form a hook 18, as seen in Figure 1, and said plate, near to but spaced from the hook 18, is provided with an opening 19.

A flexible member, such as a cable 20 has an intermediate portion trained around the grooved periphery of the pulley wheel 12. The end portions or reaches of the cable 20 extend from the pulley wheel 12 through the openings 10 of the yoke portions 6 and 7. One terminal 21 of the cable 20 extends through one of the openings 17 and is secured directly to the anchor plate 16 and the other cable end 22 is similarly secured to an eyebolt 23 forming one end of a turnbuckle, designated generally 24. A hook 25, constituting the opposite end of the turnbuckle 24, engages the other opening 17 and is thus detachably connected to the anchor plate 16.

For the purpose of illustrating a preferred application and use of the harness attachment 5, a partial girth joint, designated generally 26, has been illustrated and which may be assumed, for example, to constitute a part of a hydraulic turbine. The girth joint as illustrated includes a frame part 27 around which the hook 18 of the anchor plate 16 may be engaged for detachably securing the anchor plate thereto. A bolt or stud 28 is shown projected from the frame part 27 through the opening 19. Where such a stud or bolt is available the hook 18 need not be used and the anchor plate 16 may be inverted from its position of Figure 1 by disengaging the turnbuckle hook 25 therefrom and inverting the plate 16 and then re-engaging the hook 25 therewith, so that the anchor plate hook 18 will then project upwardly. Otherwise, where a bolt or stud 28 is not available, the hook 18 is employed. A rod or bar 29 extends through apertures 30 of spaced frame parts 31 of the girth joint 26 to provide an anchor member to be engaged by the pulley hook 15, as seen in Figures 1 and 4. The length of the rod or bar 29 will vary depending upon the spacing between the frame parts 31. Likewise, the hook 15 may be directly engaged with any available part of the partial girth joint 26.

Reverting back to the hammer holder-on 9 which is of conventional construction, said tool includes a plunger 32 which projects from the forward end of the cylinder 8. A conduit, such as a hose 33 leading from any suitable source of air under pressure, is provided with a conventional shut-off valve 34 adjacent its outlet end, which outlet end is connected to a nipple 35 which opens into the rear end of the cylinder 8. The cylinder 8 is also provided with a manually actuated relief valve 36.

A conventional portable pneumatic hammer 37 is shown disposed within the partial girth joint 26. After the harness attachment 5 has been applied to the hammer holder-on 9 and connected to the partial girth joint by means of the pulley 11 and anchor plate 16, as illustrated in Figure 1 and as previously described, with the plunger 32 in a retracted position, rather than in a projected position as illustrated in Figure 1, the turnbuckle 24 is adjusted to tighten or loosen the cable 20 so that the hammer holder-on may slide freely relatively to the cable 20 toward and away from the pulley 11 and anchor plate 16 and with the outer end of the plunger 32 spaced slightly from the headed outer ends of rivets 38, by which the sections forming the girth joint 26 are to be connected. Accordingly, the hammer holder-on 9 may thus be positioned with its plunger 32 in radial alignment with a rivet 38, after which the valve 34 is manually opened to admit compressed air to the rear end of the cylinder 8 for projecting the plunger 32 sufficiently so that the outer end will engage against and receive the head 39 of the rivet 38 and so that the end portions or reaches of the cable 20 will be tensioned. The valve 34 may then be closed for maintaining a desired amount of pressure in the cylinder 8 to maintain the plunger 32 in a desired projected position and so that the harness attachment 5 will then maintain the holder-on 9 in its position of Figure 1. If desired, the operator may then assume a position on the inner side of the girth joint for operating the pneumatic hammer 37 for upsetting and heading the inner end of the rivet 38 which is held by the hammer holder-on 9. Obviously, if desired, the pneumatic hammer 37 may be operated by a second workman but it will be apparent that this is not essential, since the harness 5 will maintain the tool 9 in an applied and operative position. After the inner end of the rivet has been headed or upset, the relief valve 36 is manually actuated to release the compressed air from the cylinder 8 to permit retraction of the plunger 32 and so that the hammer holder-on 9 can then slide in either direction along the cable reaches circumferentially of the partial girth joint 26 and to a position to engage the head of another rivet, for repeating the operation as previously described.

For the purpose of clarity, the attachment 5, except for the length of the cable 20, and the tools 9 and 37 have been shown greatly enlarged relatively to the girth joint 26. Ordinarily, the girth joint will be approximately three times the size as illustrated in ratio to the sizes of the tools 9 and 37 and of the attachment 5, as shown. However, said attachment may obviously be employed with girth joints of various sizes by merely varying the length of the cable 20.

Various modifications and changes are contemplated and may obviously be resorted to, without departing from the spirit or scope of the invention as hereinafter defined by the appended claims.

I claim as my invention:

1. A harness attachment for a hammer holder-on comprising a yoke adapted to be secured to a cylinder of a hammer holder-on including sections projecting outwardly from opposite sides of said cylinder, said yoke sections having openings disposed transversely of the longitudinal axis of the hammer holder-on, a pulley including a frame, a wheel journalled in said frame and a hook projecting from the frame, said hook being adapted to be detachably anchored to a part of a partial girth joint, an anchor plate, means forming a part of said anchor plate for detachably connecting said plate to another part of the partial girth joint and in circumferentially spaced relationship to said pulley, an elongated flexible member having an intermediate portion trained around the pulley wheel and end portions connected to laterally spaced parts of said anchor plate, complementary portions of said flexible member, disposed between the pulley and anchor plate, extending slidably through the openings of said yoke sections for supporting the hammer holder-on on the outer side of and substantially radially with respect to the partial girth joint, said yoke sections being slidable relatively to the flexible member for movement of the yoke and hammer holder-on relatively to the flexible member toward and away from the pulley and anchor plate and circumferentially of the partial girth joint.

2. A harness attachment as in claim 1, said flexible member comprising a cable and a turnbuckle connecting one end of said cable to said anchor plate providing means for loosening or tightening the cable between the anchor plate and pulley.

3. A harness attachment as in claim 2, said anchor plate having a relatively wide end provided with laterally spaced openings by which an end of the cable and an end of said turnbuckle are connected to the anchor plate.

4. A harness attachment as in claim 1, said anchor plate having a relatively wide end provided with laterally spaced openings in which the ends of said flexible member are connected to the anchor plate, said anchor plate means comprising an opening spaced from said end of the anchor plate and adapted to engage over a stud element of the partial girth joint.

5. A harness attachment as in claim 1, said anchor plate means comprising a hook portion disposed remote from the portion of the anchor plate secured to said flexible member.

6. A harness attachment as in claim 1, said yoke sections extending radially and longitudinally from the hammer holder-on cylinder including portions disposed beyond an inner end of said cylinder provided with the openings through which said flexible member slidably extends.

No references cited.